(12) United States Patent
Cermak

(10) Patent No.: US 7,677,983 B2
(45) Date of Patent: Mar. 16, 2010

(54) DRIVE ASSEMBLY WITH AN INTERMEDIATE BEARING

(75) Inventor: Herbert Cermak, Bessenbach (DE)

(73) Assignee: GKN Driveline Deutschland GmbH, Offenbach (DE)

( * ) Notice: Subject to any disclaimer, the term of this patent is extended or adjusted under 35 U.S.C. 154(b) by 711 days.

(21) Appl. No.: 11/493,318

(22) Filed: Jul. 26, 2006

(65) Prior Publication Data

US 2007/0093304 A1    Apr. 26, 2007

(30) Foreign Application Priority Data

Aug. 2, 2005   (DE) ...................... 10 2005 036 789

(51) Int. Cl.
*F16D 3/84* (2006.01)

(52) U.S. Cl. ...................... 464/178; 464/906

(58) Field of Classification Search ......... 464/173–175, 464/178, 905–906
See application file for complete search history.

(56) References Cited

U.S. PATENT DOCUMENTS

| | | | | |
|---|---|---|---|---|
| 2,362,456 A | * | 11/1944 | Alden | ........................ 464/175 |
| 3,858,412 A | * | 1/1975 | Fisher et al. | ................. 464/146 |
| 4,430,066 A | * | 2/1984 | Benassi | ....................... 464/178 |
| 4,909,773 A | * | 3/1990 | Schlecher et al. | |
| 6,171,196 B1 | | 1/2001 | Welschof | |
| 6,322,155 B1 | * | 11/2001 | Chen | |
| 6,379,255 B1 | | 4/2002 | Cermak et al. | |
| 6,422,947 B1 | * | 7/2002 | Kelly et al. | ................. 464/178 |
| 2003/0127908 A1 | * | 7/2003 | Lyon et al. | |

* cited by examiner

*Primary Examiner*—Greg Binda
(74) *Attorney, Agent, or Firm*—Rader, Fishman & Grauer, PLLC

(57) ABSTRACT

A drive assembly of a propeller shaft for use in the driveline of a motor vehicle, includes an intermediate bearing (31); a constant velocity universal joint (34); a shaft journal (33) having a first journal diameter (D1), and a free journal end which is connected to the constant velocity universal joint (34) and having a second journal diameter (D2), wherein a first journal length (L1) is measured between the bearing center of the intermediate bearing (31) and the joint center (34), and a second journal length (L2) is measured between the axial securing ring and the joint center; a rolling boot (43) is connected to an outer joint part (35) by a first collar and is positioned on the shaft journal (33) by a second collar; wherein the ratio between the second journal length (L2) and the second journal diameter (D2) is less than 2.0.

18 Claims, 4 Drawing Sheets

DRIVE ASSEMBLY WITH AN INTERMEDIATE BEARING

TECHNICAL FIELD

The invention relates to a drive assembly of a driveshaft, more particularly of a propeller shaft, for being used in the driveline of a motor vehicle.

BACKGROUND OF THE INVENTION

The drive assembly comprises an intermediate bearing, a constant velocity universal joint, a shaft journal which is rotatably held in the intermediate bearing and which, by means of a free journal end, is inserted into the inner joint part of a constant velocity universal joint. The drive assembly also comprises a rolling boot which is connected to the outer joint part by means of a first collar and which is positioned on the shaft journal via a second collar.

A drive assembly with a driveshaft and an intermediate bearing of the above-mentioned type is known from U.S. Pat. No. 6,171,196, for example. It has always been regarded as desirable to keep the axial distance between the resilient intermediate bearing of a propeller shaft and the adjoining constant velocity universal joint as short as possible. However, when using plunging joints it is desirable to provide shaft journals with a long length with correspondingly long rolling boots to seal the joint even under conditions of extreme axial displacements in the propeller shaft.

However, so far, when fixed joints are used next to the resilient intermediate bearings of propeller shafts, it has been necessary to use relatively long journal lengths of the shaft journal arranged therebetween in order to make it possible to mount the collar of the rolling boot to be secured to the shaft journal. For positioning the clamp band, the rolling boot collar has to be freely radially accessible. Such a drive assembly is known from U.S. Pat. No. 6,379,255.

The prior art drive assemblies lead to low internal bending frequencies of the entire propeller shaft which, disadvantageously, are easily reached under operational conditions and which can cause strong vibrations in the region of the intermediate bearing assembly to achieve a variable distribution of torque.

SUMMARY OF THE INVENTION

The present invention provides an improved drive assembly for a driveshaft, more particularly for a propeller shaft, to be used in the driveline of a motor vehicle, which drive assembly comprises an increased internal bending frequency and in which vibration excitations at the intermediate bearing are reduced.

A first solution provides a drive assembly of a driveshaft, more particularly of a propeller shaft, for use in the driveline of a motor vehicle, comprising an intermediate bearing; a constant velocity universal joint; a shaft journal comprising a bearing seat which is rotatably received in the intermediate bearing and extending between a bearing stop and axial securing mechanism and having a first journal diameter $D1$, the shaft journal further comprising a free journal end which is inserted into an inner joint part of the constant velocity universal joint and having a second journal diameter $D2$, wherein a first journal length $L1$ is measured between the bearing center of the intermediate bearing and the joint center of the constant velocity universal joint, and wherein a free second journal length $L2$ is measured between the axial securing mechanism and the joint center; a rolling boot which, by a first collar, is connected to an outer joint part of the constant velocity universal joint and, by a second collar, is positioned on the shaft journal; wherein the ratio between the second journal length $L2$ and the second journal diameter $D2$ is less than 2.0.

The inventive solution is advantageous in that the shaft journal is particularly compact and comprises a relatively short length so that the internal bending frequencies of the driveshaft are increased. This leads to a reduction in the vibrations at the intermediate bearing, which has advantageous effects on wear and service life. At the same time, the second collar of the rolling boot is freely accessible for assembly purposes.

In a further embodiment, the ratio between the free second journal length $L2$ and the first journal diameter $D1$ in the region of the intermediate bearing is less than 1.8. Furthermore, it is advantageous if the ratio between the first journal length $L1$ and the second journal diameter $D2$ in the region of the constant velocity joint is smaller than 2.8. The ratio between the first journal length $L1$ and the first journal diameter $D1$ in the region of the intermediate bearing 31 is advantageously less than 2.2. According to another embodiment, the shaft journal comprises a third journal length $L3$ which is measured between the second collar 46 of the rolling boot and the joint center, wherein the ratio between the first journal length $L1$ and the third journal length $L3$ is greater than 1.8. In one embodiment, the rolling boot is connected to the outer joint part by a sheet metal annular cap, wherein the sheet metal cap comprises a cap length $L4$ measured between the outer joint part and the first collar, wherein the ratio between the first journal length $L1$ and the cap length $L4$ is greater than 2.5. Overall, the above measures result in a shorter shaft journal which generates higher internal bending frequencies of the driveshaft.

According to a further embodiment, the first collar is formed into the sheet metal annular cap and the second collar is secured by a clamp band on the shaft journal. The rolling boot opens like a semi-torus towards the shaft bearing. The rolling boot comprises a wall portion which connects the first collar and the second collar and which, in the extended condition, with the constant velocity universal joint being in the coaxially aligned condition, comprises a defined arch length, wherein the arch length is such that, even if the constant velocity universal joint is articulated by amounts which are smaller than the maximum articulation angle, a material elongation takes place in the wall portion of the rolling boot. The arch length of the neutral phase of the rolling boot wall and the axial extension of the semi-torus-shaped rolling boot can be reduced considerably to enable the latter to reach the material elongation range even at relatively small articulation angles of smaller than 12°, more particularly 7°. The rolling boots used here are special rolling boots for use in propeller shafts which do not have to be designed on the basis of the possibly greater bending capacity of the constant velocity universal joints used.

A second inventive solution provides a drive assembly of a driveshaft, more particularly of a propeller shaft, for use in the driveshaft of a motor vehicle, comprising an intermediate bearing; a constant velocity universal joint; a shaft journal comprising a bearing seat which is rotatably received in the intermediate bearing and extending between a bearing stop and axial securing mechanism and having a first journal diameter $D1$, the shaft journal further comprising a free journal end which is inserted into an inner joint part of the constant velocity universal joint and having a second journal diameter $D2$, wherein a first journal length $L1$ is measured between the bearing center of the intermediate bearing and the joint center of the constant velocity universal joint, and wherein a free second journal length L2 is measured between the axial securing mechanism and the joint center; a membrane boot which, by a first collar, is connected to an outer joint part of the constant velocity universal joint and, by a second collar, is connected to the shaft journal; wherein the ratio between the second journal length L2 and the second journal diameter D2 in the region of the constant velocity universal joint is smaller than 1.25.

The shape of the membrane seal as described permits a further reduction in the distance between the sheet metal sleeve provided for fixing the membrane seal on the outer joint part, and thus a further reduction in the axial distance from the design center of the resilient bearing sleeve and the center of the constant velocity joint. This results in particularly high internal bending frequencies of the driveshaft.

The ratio between the free second journal length L2 and the first journal diameter D1 in the region of the intermediate bearing can be less than 1.1. Furthermore, it is advantageous if the ratio between the first journal length L1 and the second journal diameter D2 in the region of the constant velocity joint is less than 2.0. The ratio between the first journal length L1 and the first journal diameter D1 in the region of the intermediate bearing can also be less than 1.55.

According to another embodiment, the shaft journal comprises a third journal length L3 which is measured between the second collar of the membrane boot and the joint center, wherein the ratio between the first journal length L1 and the third journal length L3 is greater than 2.35. The membrane boot can be connected by a sheet metal annular cap to the outer joint part, wherein the sheet metal annular cap comprises a cap length L4 which is measured between the outer joint part and the first collar, wherein the ratio between the first journal length L1 and the cap length L4 is greater than 3.0. Overall, these measures result in a particularly short shaft journal, so that higher internal bending frequencies of the driveshaft are achieved.

Instead of fixing the second collar by a clamp band, it is possible, when using a membrane boot, to fix the second collar on the shaft journal by a securing ring inserted into a corresponding annular groove. The second collars of both sealing boots can engage a corresponding groove of the shaft journal which, in the seat region, can also have a constant diameter. Alternatively, the sealing boots, by their second collars, can also engage an annular groove of an intermediate sleeve which is held on the shaft journal between the intermediate bearing and the constant velocity universal joint. The shape of the membrane seal can be such that annular undulations oscillate around a radial central plane. In this case, too, the principle is to allow the membrane seal used to reach the range of elastic elongation even at small articulation angles of the constant velocity universal joint, more particularly at articulation angles smaller than 7.5°, and even at articulation angles smaller than 3.5°. The shaft bearing is normally the resilient intermediate bearing and, respectively, the central bearing of a propeller shaft, as already mentioned.

Other advantages and features of the invention will also become apparent upon reading the following detailed description and appended claims, and upon reference to the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention.

DETAILED DESCRIPTION OF THE DRAWINGS

Figure 1:
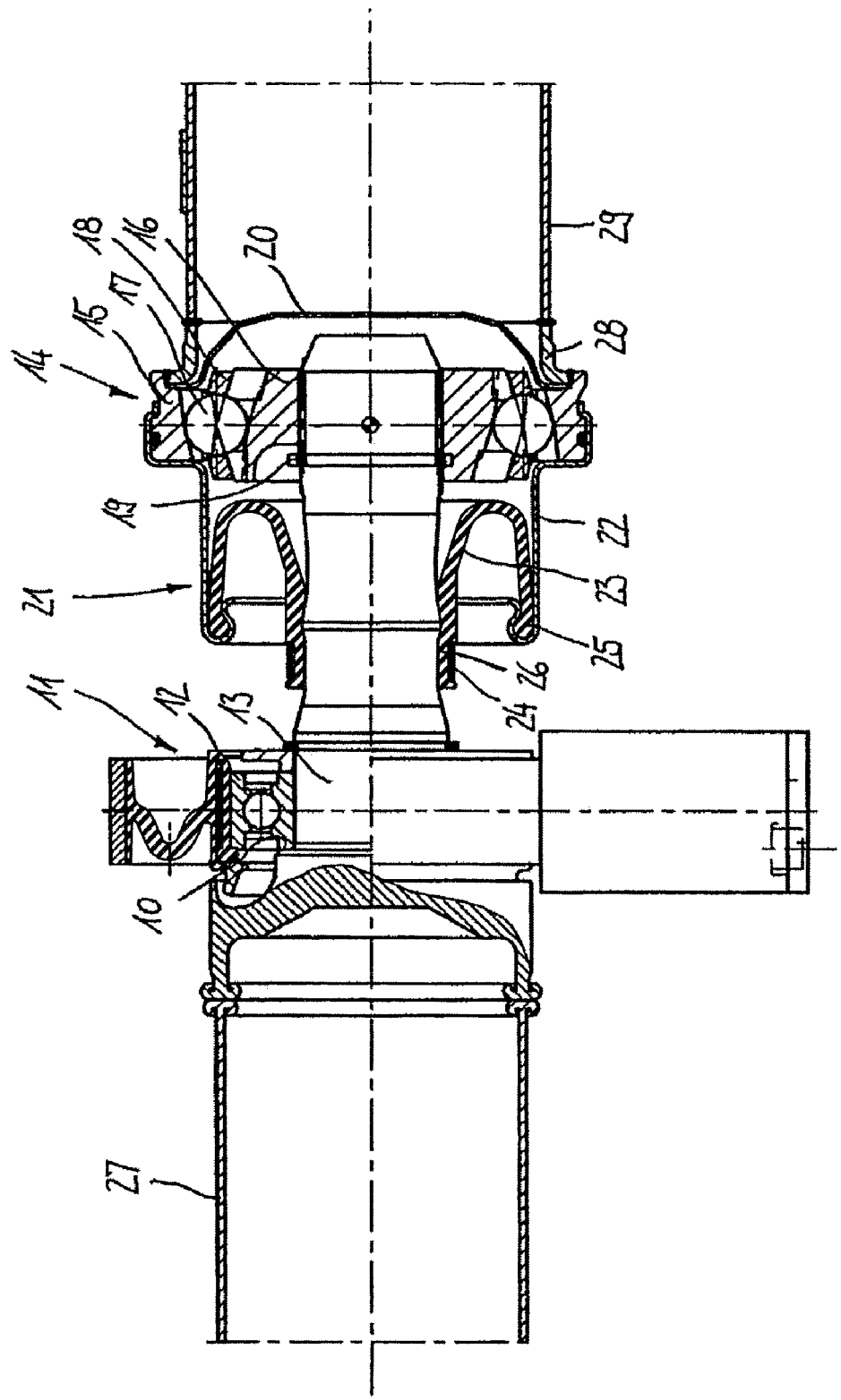
FIG. 1 shows a drive assembly comprising a constant velocity universal joint and an intermediate bearing according to the state of the art.

FIG. 1 shows part of a propeller shaft of a motor vehicle; it is possible to see a resilient intermediate bearing 11 in which there is supported a shaft journal 13 via a rolling contact bearing 12. For this purpose, the shaft journal 13 comprises a bearing seat which extends between a bearing stop 10 and axial securing mechanism for fixing the inner bearing race. A constant velocity universal joint 14 provided in the form of a counter track joint is connected to the shaft journal 13. The primary components of the joint are an outer joint part 15, an inner joint part 16, torque transmitting balls 17 and a ball cage 18. The pairs of tracks (not referred to in greater detail) in which the torque transmitting balls 17 are held, open around the circumference alternatively in opposite axial directions (counter track joint). The inner joint part 16 is secured by a securing ring 19 on the shaft journal 13. Towards the right, the outer joint part 15 and thus the entire joint is sealed by a sheet metal cover 20. The joint is sealed relative to the shaft journal 13 by a joint seal 21 which comprises a sheet metal annular cap 22 connected to the outer joint part 15, a rolling boot 23 and a clamping strip 24. A first bead-shaped collar 25 of the rolling boot 23 is formed into the sheet metal annular cap 22. A second collar 26 is positioned directly on the shaft journal 13 and is axially fixed to the clamp band 24. To be able to secure the clamp band 24 on the collar 26, an axial distance is required between the sheet metal annular cap 22 and the resilient intermediate bearing 11. This leads to a long axial length of the shaft journal 13. The long journal length disadvantageously affects the internal bending frequency of the driveshaft with which the shaft journal is associated in that the greater journal length causes a lower and thus disadvantageous internal bending frequency. With regard to the driveshaft, it is possible to identify a first tubular shaft portion 27 which is welded to the shaft journal 13 and as well as a hollow shaft portion 29 welded on by a transition piece 28.

Figure 2:
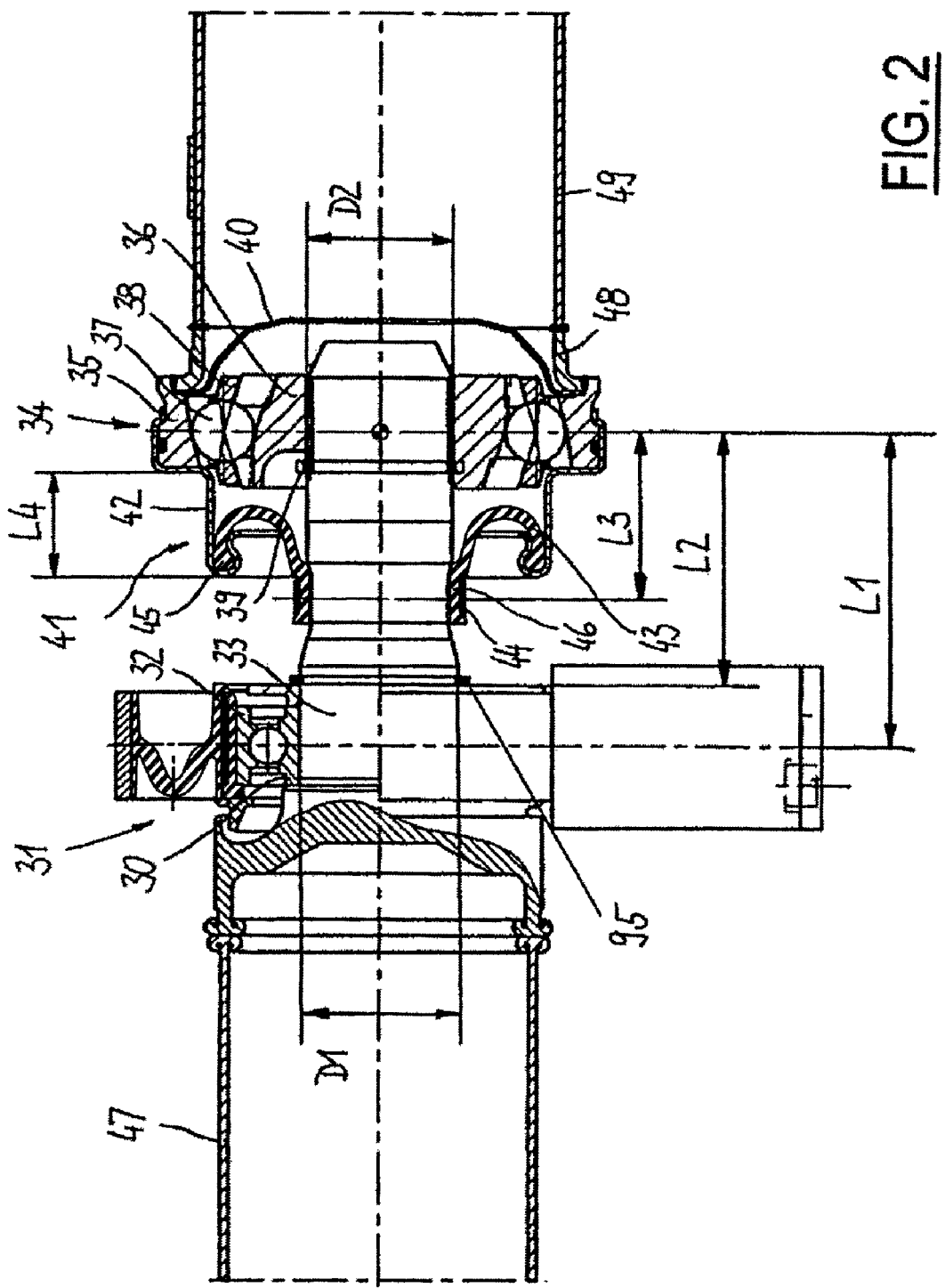
FIG. 2 shows an inventive drive assembly comprising a constant velocity universal joint and an intermediate bearing in a first embodiment.

Any details in FIG. 2 identical to those shown in FIG. 1 have been given reference numbers increased by 20. To that extent, reference is made to the description of FIG. 1. It can be seen that, in the region of the rolling contact bearing 32, the shaft journal 33 comprises a bearing seat by which the shaft journal 33 is rotatably received in an inner bearing race of the rolling contact bearing 32. The bearing seat which extends between a bearing stop 30 and axial securing mechanism 95 comprises a first journal diameter D1. At its free journal end which is inserted into the inner joint part 36 of the constant velocity universal joint 34, the shaft journal 33 comprises a second journal diameter D2. Between the bearing center of the intermediate bearing 31 and the joint center of the constant velocity universal joint 34, there extends a first journal length L1, and between the axial securing ring 95 and the joint center, there extends a second journal length L2. Furthermore, a third journal length L3 is defined at the shaft journal 33 between the second collar 46 of the rolling boot 43 and the joint center. The sheet metal annular cap 42 comprises a cap length L4 which extends between an end face of the outer joint part 35 and the first collar 46.

In accordance with an embodiment of the invention, the ratio between the second journal length L2 and the second journal diameter D2 is less than 2.0 and, in the present case, amounts to approximately 1.9. Furthermore, the ratio between the free second journal length L2 and the first journal diameter D1 in the region of the intermediate bearing is less than 1.8 and, in this embodiment, amounts to approximately 1.6. The ratio between the first journal length L1 and the second journal diameter D2 in the region of the constant velocity joint is, more particularly, less than 2.2 and, in this case, is approximately equal to 2.0. The ratio between the first journal length L1 and the third journal length L3 is greater than 1.8 and, in the present embodiment, amounts to approximately 1.9. The ratio between the first journal length L1 and the cap length L4 is greater than 2.5 and, in this case, amounts to approximately 3.0. The shaft journal 33 designed in accordance with the above calculations is considerably shorter than the shaft journal according to FIG. 1. As a result, the internal bending frequencies of the propeller shaft are displaced into higher frequency ranges, so that the tendency for the occurrence of vibrations at the intermediate bearing 31 is reduced.

The rolling boot 43 comprises a wall portion which is connected by the two collars 44, 45 and which, in the aligned condition of the constant velocity universal joint 34, comprises a defined arch length. The arch length is such that, even at articulation angles of the constant velocity universal joint 34 which are smaller than the maximum articulation angle, a material elongation occurs at the rolling boot 43 in the wall portion. The rolling boot 43 which is based on said calculation principles and which, more particularly, at joint articulation angles smaller than 12°, and even at joint articulation angles smaller than 7°, reaches the material elongation range, is considerably shorter than the rolling boot according to FIG. 1, so that, as a result, the sheet metal annular cap 42 can also be shorter, with the distance between the bearing center of the intermediate bearing 31 and the joint center of the constant velocity joint 34 becoming shorter still. In consequence, the internal bending frequencies of the propeller shaft are further increased and improved.

Figure 3:
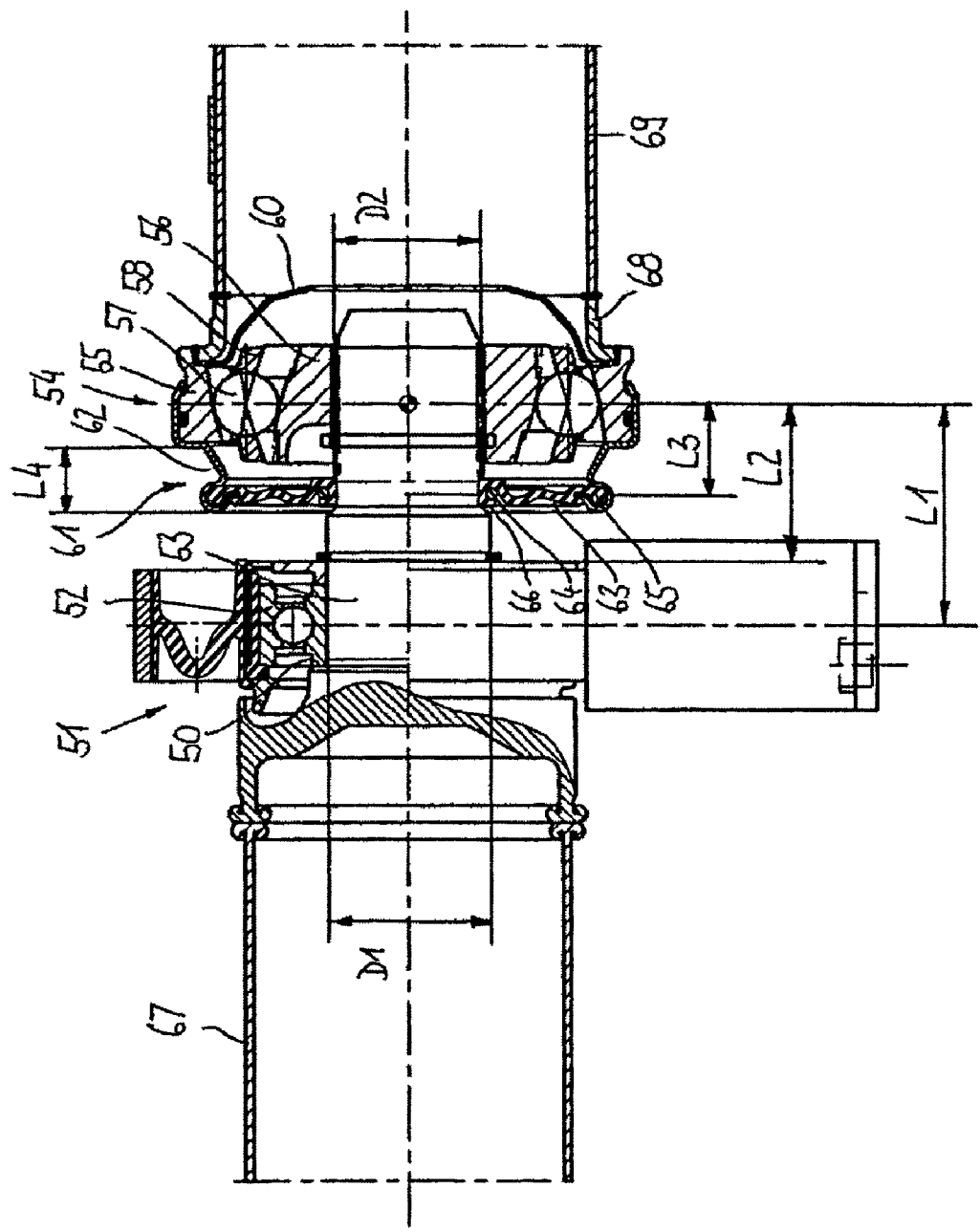
FIG. 3 shows an inventive drive assembly comprising a constant velocity universal joint and an intermediate bearing in a second embodiment.

In FIG. 3, the reference numbers of any details identical to those in FIG. 1 have been increased by 40 and those identical to FIG. 2 have been increased by 20. To that extent, reference is made to the descriptions of FIGS. 1 and 2. Instead of the rolling boot according to the state of the art, FIG. 3 shows an inventive membrane seal 63 which extends wave-like from the inside to the outside around an imaginary central plane.

In accordance with the invention, the ratio between the second journal length L2 and the second journal diameter D2 in the region of the constant velocity universal joint is less than 1.25 and, in the present embodiment, amounts to approximately 1.15. Furthermore, the ratio between the free second journal length L2 and the first journal diameter D1 in the region of the intermediate bearing is less than 1.1 and, in this case, amounts to approximately 1.0. The ratio between the first journal length L1 and the second journal diameter D2 in the region of the constant velocity universal joint is, more particularly, less than 2.0 and, in the present embodiment, amounts to approximately 1.6. The ratio between the first journal length L1 and the first journal diameter D1 in the region of the intermediate bearing 51 is less than 1.55 and, in this case, amounts to approximately 1.4. The ratio between the first journal length L1 and the third journal length L3 is greater than 2.35 and, in the present embodiment, amounts to approximately 2.5. The ratio between the first journal length L1 and the cap length L4 is greater than 3.0 and, in the present case, amounts to approximately 3.5. The shaft journal 53 designed in accordance with these calculation principles is shorter, again, than the shaft journal according to FIG. 2. In consequence, the internal bending frequencies of the propeller shaft are displaced into advantageous ranges, i.e. into higher frequency ranges, so that the susceptibility to vibrations at the intermediate bearing 51 is reduced.

In this case, too, the membrane boot comprises a wall portion which connects the two collars 65, 66 to one another and which, in the extended condition, with the constant velocity universal joint 54 being in a coaxially aligned condition, comprises a neutral phase of a defined length in the radial section, with the length of the neutral phase being such that, even at articulation angles of the constant velocity universal joint 54 which are smaller than the maximum articulation angle, the membrane seal 63 is subject to a material elongation in the wall portion. As a result of this design, with an elastic material elongation of the membrane seal already occurring at joint articulation angles less than 7.5°, preferably even at angles less than 3.5°, the shaft journal can be designed to be shorter still. On the basis of this design, the sheet metal annular cap 62 into which the membrane seal 63 with its first collar 65 is formed, can be axially very short, the result being that again the distance between the center of the resilient shaft bearing 51 and the joint center of the constant velocity universal joint 54 can be shorter still as compared to the state of the art and also as compared to the embodiment according to FIG. 2.

Figure 4:
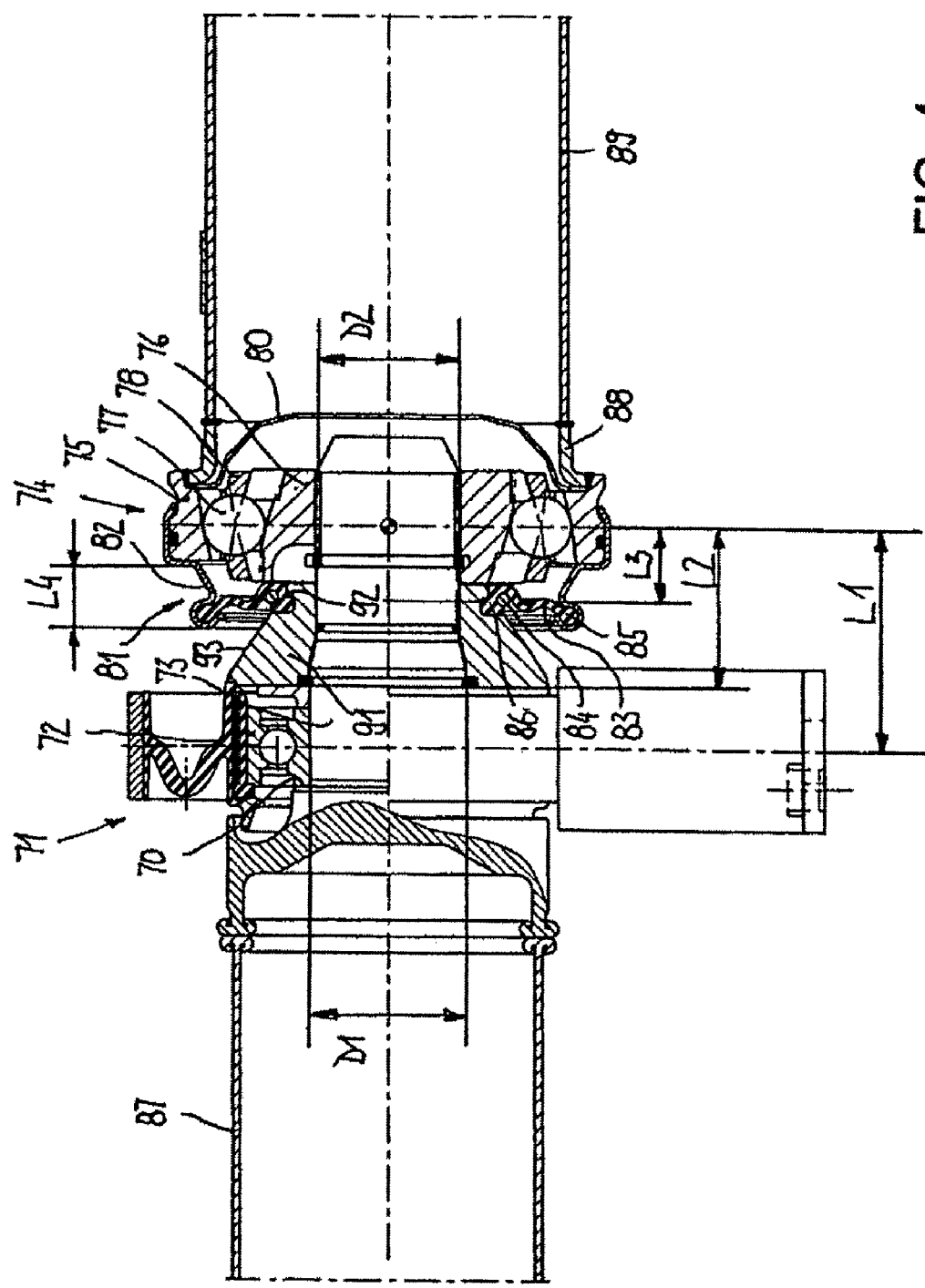
FIG. 4 shows an inventive drive assembly comprising a constant velocity universal joint and an intermediate bearing in a third embodiment.

In FIG. 4, the reference numbers of any details identical to those shown in FIG. 3 have been increased by 20. To that extent, reference is largely made to the description of FIG. 3. In the present embodiment, the shaft journal is designed on the basis of the same calculation principles as in the embodiment according to FIG. 3. Instead of the membrane boot 83 being fixed to the shaft journal 73, there is, in the present embodiment, provided an intermediate sleeve 91 with an annular groove 92 which is form-fittingly and positively engaged by the second collar 86, with the second collar 86 being fixed by a securing ring 84 at the intermediate sleeve 91. The intermediate sleeve 91 is held on the shaft journal 73 via a slight press fit in order to avoid any radial play and any related out-of-balance. On its outside, the intermediate sleeve 91 comprises a conical face 93 which is tapered towards the free end of the shaft journal 73. This results in the shaft journal 73 being centered and guided in the shaft tube 89 in the case of a crash, i.e. after the constant velocity universal joint 74 has been destroyed.

While the invention has been described in connection with several embodiments, it should be understood that the invention is not limited to those embodiments. Thus, the invention covers all alternatives, modifications, and equivalents as may be included in the spirit and scope of the appended claims.

What is claimed is:

1. An assembly for use in the driveline of a motor vehicle, comprising:
    an intermediate bearing;
    a constant velocity universal joint;
    a shaft journal comprising a bearing seat which is rotatably supported in the intermediate bearing and extends between a bearing stop (50, 70) and axial securing mechanism and having a first journal diameter (D1), the shaft journal further comprising a free journal end which is inserted into an inner joint part of the constant velocity universal joint and having a second journal diameter (D2), wherein a first journal length (L1) is measured between a bearing center of the intermediate bearing and a joint center of the constant velocity universal joint, and wherein a second journal length (L2) is measured between the axial securing mechanism and the joint center; and a membrane boot which is connected to an outer joint part of the constant velocity universal joint by a first collar and to the shaft journal by a second collar;

wherein a ratio of the second journal length (L2) to the second journal diameter (D2) in the region of the constant velocity universal joint is less than 1.25.

2. An assembly according to claim 1, wherein a ratio of the second journal length (L2) to the first journal diameter (D1) in the region of the intermediate bearing is less than 1.1.

3. An assembly according to claim 2, wherein a ratio of the first journal length (L1) to the second journal diameter (D2) in the region of the constant velocity joint is less than 2.0.

4. An assembly according to claim 3, wherein a ratio of the first journal length (L1) to the first journal diameter (D1) in the region of the intermediate bearing is less than 1.55.

5. An assembly according to claim 2, wherein a ratio of the first journal length (L1) to the first journal diameter (D1) in the region of the intermediate bearing is less than 1.55.

6. An assembly according to claim 2, wherein the shaft journal comprises a third journal length (L3) which is measured between the second collar of the membrane seal and the joint center, wherein a ratio of the first journal length (L1) to the third journal length (L3) is greater than 2.35.

7. An assembly according to claim 1, wherein a ratio of the first journal length (L1) to the second journal diameter (D2) in the region of the constant velocity joint is less than 2.0.

8. An assembly according to claim 7, wherein a ratio of the first journal length (L1) to the first journal diameter (D1) in the region of the intermediate bearing is less than 1.55.

9. An assembly according to claim 7, wherein the shaft journal comprises a third journal length (L3) which is measured between the second collar of the membrane seal and the joint center, wherein a ratio of the first journal length (L1) to the third journal length (L3) is greater than 2.35.

10. An assembly according to claim 1, wherein a ratio of the first journal length (L1) to the first journal diameter (D1) in the region of the intermediate bearing is less than 1.55.

11. An assembly according to claim 10, wherein the shaft journal comprises a third journal length (L3) which is measured between the second collar of the membrane seal and the joint center, wherein a ratio of the first journal length (L1) to the third journal length (L3) is greater than 2.35.

12. An assembly according to claim 1, wherein the shaft journal comprises a third journal length (L3) which is measured between the second collar of the membrane seal and the joint center, wherein a ratio of the first journal length (L1) to the third journal length (L3) is greater than 2.35.

13. An assembly according to claim 1, wherein the membrane boot is connected to the outer joint part by a metal annular cap, wherein the metal annular cap comprises a cap length (L4) which is measured between the outer joint part and the first collar, wherein a ratio of the first journal length (L1) to the cap length (L4) is greater than 3.0.

14. An assembly according to claim 13, wherein the first collar is formed into the metal annular cap and the second collar is secured by a securing ring on the shaft journal.

15. An assembly according to claim 13, wherein the first collar is formed into the metal annular cap and the second collar is secured by a securing ring on an intermediate sleeve held on the shaft journal.

16. An assembly according to claim 1, wherein the membrane seal includes a wall portion which annularly oscillates around a radial central plane.

17. An assembly according to claim 1, wherein the membrane seal comprises a wall portion which connects the first collar and the second collar and which, in the extended condition, with a coaxially aligned constant velocity universal joint, comprises a neutral phase of a defined length in the radial section, wherein the length of the neutral phase is such that, when the constant velocity universal joint is articulated by amounts which are less than the maximum articulation angle, there occurs a material elongation in the wall portion.

18. An assembly for use in the driveline of a motor vehicle, comprising:

an intermediate bearing;

a constant velocity universal joint;

a shaft journal comprising a bearing seat which is rotatably supported in the intermediate bearing and extends between a bearing stop (50, 70) and axial securing mechanism and having a first journal diameter (D1), the shaft journal further comprising a free journal end which is inserted into an inner joint part of the constant velocity universal joint and having a second journal diameter (D2), wherein a first journal length (L1) is measured between a bearing center of the intermediate bearing and a joint center of the constant velocity universal joint, and wherein a second journal length (L2) is measured between the axial securing mechanism and the joint center; and a membrane boot which is connected to an outer joint part of the constant velocity universal joint by a first collar and to the shaft journal by a second collar;

wherein a ratio of the second journal length (L2) to the second journal diameter (D2) in the region of the constant velocity universal joint is less than 1.25; and wherein the membrane boot is connected to the outer joint part by a metal annular cap, and the first collar is formed into the metal annular cap.

* * * * *